(12) United States Patent
Ritchie et al.

(10) Patent No.: US 11,114,261 B2
(45) Date of Patent: Sep. 7, 2021

(54) ELECTRICAL CONNECTOR FOR IGNITER FOR EXOTHERMIC WELDING

(71) Applicant: ERICO INTERNATIONAL CORPORATION, Solon, OH (US)

(72) Inventors: Wayne William Ritchie, Orwell, OH (US); Erika Lynn Buehman, Cleveland, OH (US); Greg Martinjak, Solon, OH (US)

(73) Assignee: ERICO International Corporation, Solon, OH (US)

( * ) Notice: Subject to any disclaimer, the term of this patent is extended or adjusted under 35 U.S.C. 154(b) by 0 days.

(21) Appl. No.: 16/775,458

(22) Filed: Jan. 29, 2020

(65) Prior Publication Data

US 2020/0243282 A1 Jul. 30, 2020

Related U.S. Application Data

(60) Provisional application No. 62/798,093, filed on Jan. 29, 2019.

(51) Int. Cl.
*B23K 20/16* (2006.01)
*B23K 37/02* (2006.01)
(Continued)

(52) U.S. Cl.
CPC .......... *H01H 21/24* (2013.01); *B23K 20/165* (2013.01); *B23K 23/00* (2013.01); *B23K 37/0258* (2013.01); *H01H 21/04* (2013.01); *H01H 21/12* (2013.01); *H01R 11/24* (2013.01); *H01R 24/20* (2013.01); *H01H 2231/048* (2013.01)

(58) Field of Classification Search
CPC .............. B23K 20/165; B23K 37/0258; H01R 13/193; H01R 13/62933; H01R 13/6275; H01R 24/20; H01R 11/24; H01H 21/12; H01H 21/24
See application file for complete search history.

(56) References Cited

U.S. PATENT DOCUMENTS 4,879,452 A * 11/1989 Kovarik ................. B23K 23/00
219/130.4
5,145,106 A 9/1992 Moore et al.
(Continued)

FOREIGN PATENT DOCUMENTS

WO 03064095 A2 8/2003
WO 2011071561 A1 6/2011
(Continued)

OTHER PUBLICATIONS

NVent Erico Cadweld Plus Control Unit Replacement Lead, product information, Copyright 2020 nVent, 1 page.
(Continued)

*Primary Examiner* — Vanessa Girardi
(74) *Attorney, Agent, or Firm* — Quarles & Brady LLP

(57) ABSTRACT

An electrical connector can be provided for connecting a power source to an insertable conductor, including an igniter for exothermic weld material. One or more conductors can be disposed within a housing that is configured to receive the insertable conductor. An actuator can be engaged from outside the housing to move at least one of the conductors within the housing between resting and actuated orientations.

20 Claims, 13 Drawing Sheets

(51) Int. Cl.
*H01R 11/24* (2006.01)
*H01R 24/20* (2011.01)
*H01H 21/24* (2006.01)
*H01H 21/04* (2006.01)
*B23K 23/00* (2006.01)
*H01H 21/12* (2006.01)

(56) References Cited

U.S. PATENT DOCUMENTS

| | | |
|---|---|---|
| 6,835,910 B2 | 12/2004 | Moore et al. |
| 6,994,244 B2 | 2/2006 | Harger et al. |
| 7,278,891 B2 | 10/2007 | Cvasa et al. |
| 7,721,937 B2 | 5/2010 | Siracki et al. |
| 7,946,466 B1 | 5/2011 | Lofton |
| 7,950,568 B2 | 5/2011 | Stidham et al. |
| 7,975,900 B2 | 7/2011 | Lofton et al. |
| 8,074,864 B2 | 12/2011 | Lofton |
| 8,581,149 B2 | 11/2013 | Stidham et al. |
| 9,399,265 B2 | 7/2016 | Duaret |
| 9,562,751 B2 | 2/2017 | Harger et al. |
| 9,819,113 B2 * | 11/2017 | Adams ............... G01R 1/06788 |
| 10,350,703 B2 | 7/2019 | Abedraboh et al. |
| 2011/0250775 A1 | 10/2011 | Bies et al. |
| 2013/0199747 A1 | 8/2013 | Stidham et al. |
| 2017/0102146 A1 | 4/2017 | Harger et al. |
| 2017/0232551 A1 | 8/2017 | Abedraboh et al. |
| 2017/0348795 A1 | 12/2017 | Abedraboh et al. |

FOREIGN PATENT DOCUMENTS

| | | |
|---|---|---|
| WO | 2017143083 A1 | 8/2017 |
| WO | 2017210650 A1 | 12/2017 |

OTHER PUBLICATIONS

Harger Ultrashot Controllers and Accessories, product information, Copyright 2018 Harger Lightning & Grounding, 5 pages.
Aplicaciones Technologicas, Apliweld electronic starters and ignition unit for exothermic welding product information, Copyright 2020 Aplicaciones Technologicas S.A., 1 page.

* cited by examiner

ELECTRICAL CONNECTOR FOR IGNITER FOR EXOTHERMIC WELDING

RELATED APPLICATIONS

This application claims priority to U.S. Provisional Patent Application No. 62/798,093, titled "Electrical Connector for Insertable Conductor" and filed on Jan. 29, 2019, the entirety of which is incorporated herein by reference.

BACKGROUND

Electrical connectors are used in a variety of applications to bring two or more conductive elements into electrical communication with one another. In general, a power source can be used to deliver current through two or more electrodes to a third conductive element. The electrodes and the third conductive element can be electrically coupled by an electrical connector such as a terminal block, a distribution post, or a switch.

In exothermic welding, current can be delivered to a conductive element, including a conductive element configured as an igniter that is embedded in or otherwise exposed to weld material in order to ignite the weld material. Electrical connectors can be used to couple a power source to the conductive element to deliver current to the weld material via the conductive element, thereby melting the weld material for a desired application.

SUMMARY

Some embodiments of the invention provide an electrical connector for an igniter for exothermic welding. The electrical connector can include a housing, a first conductor enclosed by the housing, and a second conductor enclosed by and movable within the housing. The housing can include a first opening and a housing wall. The first opening can be configured to receive the igniter for engagement with the first and second conductor. The housing wall can be movable, via manual contact from outside of the housing, to move the second conductor within the housing between a resting orientation and an actuated orientation. A contact area of the second conductor can be spaced farther from the first conductor when the second conductor is in the actuated orientation than when the second conductor is in the resting orientation. The contact area can be disposed, when the second conductor is in the resting orientation, to contact a first side of the igniter, with a second side of the igniter in contact with the first conductor.

Some embodiments of the invention provide an electrical connector for an igniter for exothermic welding. The electrical connector can include a first conductor, a second conductor, a housing shell, and a housing wall. The housing shell can enclose the first and second conductors within an interior area, with an opening into the interior area to receive the igniter for conductive engagement with the first and second conductors. The housing wall can be movably secured to and at least partly outside of the housing shell, and can be configured to be moved from outside of the housing shell to move the second conductor between a resting orientation and an actuated orientation. With the second conductor in the resting orientation, the first and second conductor can engage the igniter (e.g., opposing sides thereof) to secure the igniter within the interior area and provide an electrical path from the first conductor to the second conductor via the igniter. With the second conductor in the actuated orientation, the first and second conductor can release the igniter to be removed from the interior area via the opening.

Some embodiments of the invention provide an electrical connector for an igniter strip for exothermic welding. The electrical connector can include a first conductor with a first contact area, a second conductor with a second contact area, and a housing. The housing can include an interior area that encloses the first and second conductors, an opening to receive the igniter strip into the interior area, and an actuator that is manually movable via engagement from outside of the housing to move the second conductor between a resting orientation and an actuated orientation. With the second conductor in one of the resting or actuated orientations, the second contact area can be spaced a first distance from the first contact area to hold the igniter strip between the first and second contact areas. With the second conductor in the other of the resting or actuated orientations, the second contact area can be spaced a second distance from the first contact area that is larger than the first distance.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
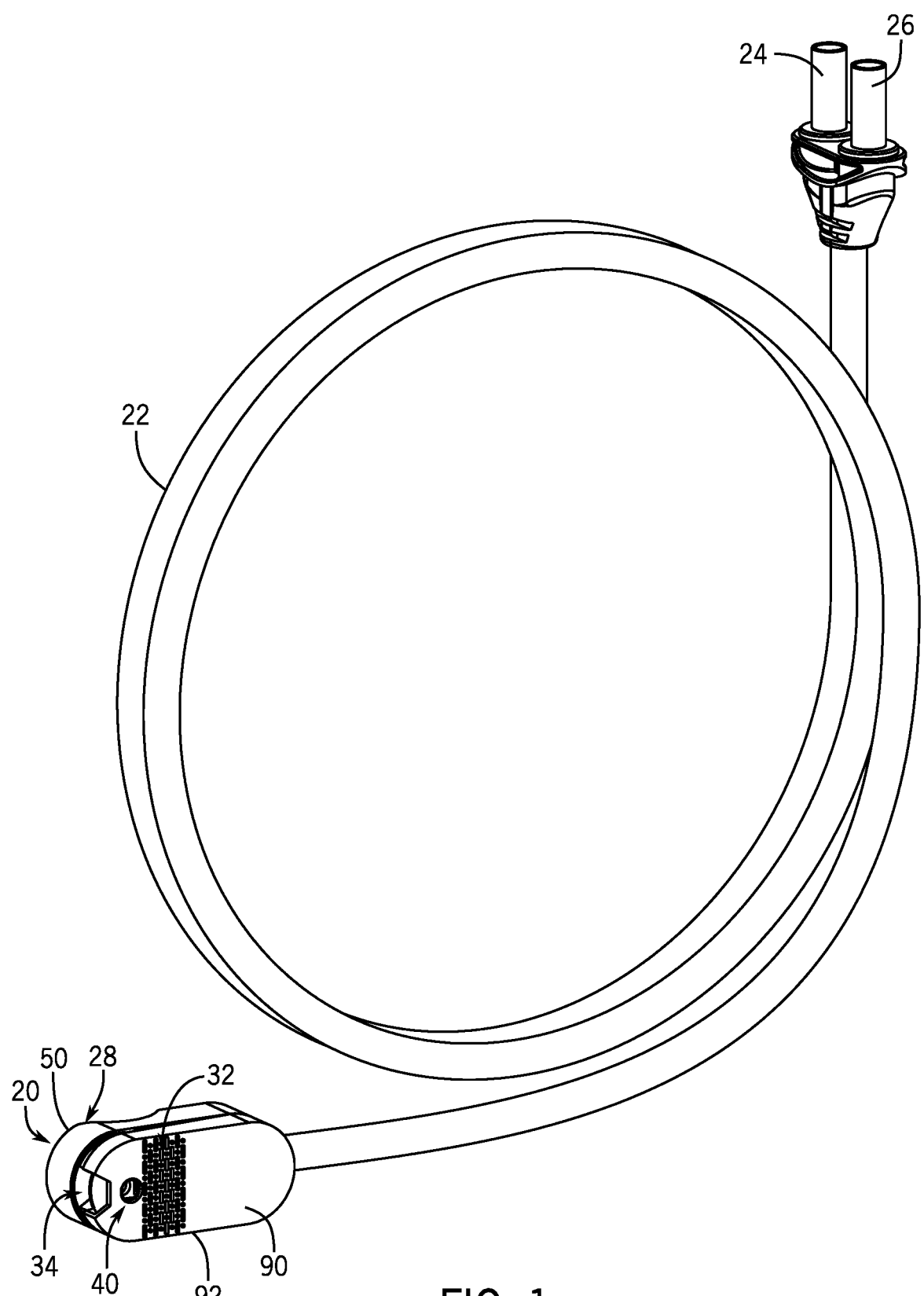
FIG. 1 is an isometric view of an electrical connector according to an embodiment of the invention with an attached jacketed cable.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

Also as used herein, unless otherwise specified or limited, directional terms are used relative to the orientation of particular FIGS. as illustrated or particular example being discussed, rather than as absolute indications of direction relative to a fixed reference (e.g., gravity). For example, reference to upper, lower, front, and back features should generally be understood to indicate relative orientations of particular components within a particular illustration or example, rather than to require absolute orientations of those components for all embodiments or uses.

Exothermic welding can be used to join metal structures, such as copper conductors of an electrical system. Generally, exothermic mixtures can include a combination of a reductant metal and a transition metal oxide. Upon ignition, these substances can react exothermically to supply sufficient heat to propagate and sustain a continuing reaction. The resulting molten metal can be used to create a useful weld, as in the case of exothermic welding, the resulting heat can be used to heat another object or system.

As noted above, current can be delivered to a conductive element, such as may be exposed to weld material (e.g., in contact with or embedded in the weld material), in order to initiate exothermic welding. For example, an ignition strip can be embedded within exothermic weld material and act as a conduit to deliver sufficient current to the weld material to initiate an exothermic reaction.

To connect an ignition strip or other igniter for exothermic welding to the electrodes of a power source, an appropriate electrical connector is generally required. However, conventional electrical connector designs can require two-hand mating of the igniter strip with the electrodes of a power source. For example, some designs may require a user to hold the ignition strip while inserting the ignition strip into the electrical connector. This can result in difficulties in establishing proper connections as well as other issues. Further, some conventional electrical connectors may not provide a sufficiently secure connection with an igniter to ensure reliable operation.

Some embodiments of the disclosed invention can provide improvements over conventional electrical connectors for exothermic welding, including with regard to ease of operation and adaptability to varied contexts. For example, some embodiments can provide the ability for a user to connect an igniter strip to an electrical connector with a single hand. Further, some embodiments provide a more robust connection between an igniter and a power source than is conventionally available, for more efficient and reliable delivery of current to the igniter for exothermic welding operations.

In some embodiments, an electrical connector can include a non-conductive housing with two conductors contained within and mechanically coupled to the housing. The conductors can be metal electrodes, for example, and the metal electrodes can be electrically coupled to a power source (e.g., via an attached cable). The housing can be constituted of a thermoplastic or other material that may be electrically insulative, as well as appropriately resistant to the effects of heat caused by a high current load carried by the metal electrodes, or other heat sources that may be near the electrical connector's application.

In some embodiments, to allow electrical connections to be effectively established (or avoided), at least one conductor within a housing can be configured as a movable conductor that can be selectively moved toward or away from another conductor within the housing. Accordingly, by moving the moveable conductor (e.g., manually from outside of the housing), a user can readily establish or terminate electrical connections between the conductors and an igniter. Moreover, in some cases, such an arrangement can allow for relatively easy (e.g., one-handed) operations to receive and secure an igniter or other insertable conductor for operation within the housing. In different embodiments, conductors can be electrically coupled when in a default (e.g., resting) orientation within the housing, or can be electrically decoupled as a default. In some embodiments, conductors can be in contact with each other (e.g., as urged together by a biasing element) when in a default orientation. In some embodiments, a first conductor can be in a fixed position within the housing while a second conductor can be biased toward or away from the first conductor. In some embodiments, multiple conductors can be movable within the housing (e.g., freely movable, or under bias).

In some embodiments, an electrical connector can include an actuator configured to move a first conductor toward or away from a second conductor within a connector housing. For example, if a first and second electrode have a default configuration of being electrically coupled within the housing, an actuator can be used to decouple the electrodes so that a conductive element can be received between the electrodes (or otherwise). Thereafter, the actuator can be released, which can allow the electrodes to return to the default configuration, and thereby, for example, press onto the conductive element to electrically couple the conductive element with the electrodes. In some embodiments, such a release of the actuator can allow electrodes within a housing to contact opposing sides of an igniter (or other third conductor) to mechanically secure the conductor within the housing, as well as to provide an electrical connection between the electrodes and the igniter.

In some embodiments, to facilitate easy connection, a housing can include an opening to receive an insertable conductive element, such as an igniter strip or other igniter for exothermic welding. In some embodiments, a housing can include a viewing window that passes through the housing so that a user can view the position of the conductive element received within the housing, including relative to two electrodes contained within the housing (e.g., as received therebetween). In some cases, a viewing window can also pass through one or more conductors within a housing, such as may allow visual access to an igniter (or other conductor) received between multiple conductors within the housing.

Thus, in some embodiments, a user can manually press an actuator on a housing, from outside of the housing, in order to open a space between two conductors within the housing. The user can then insert an igniter into the housing to be received between the two conductors, and thereafter release the actuator to electrically couple the igniter to a power source through the two conductors and, in some cases, to retain the igniter within the housing and in electrical connection with the two conductors. As appropriate, the conductors can then be used to ignite an exothermic welding reaction via the igniter. In this regard, for example, the conductors can be configured as electrodes that operate with opposite polarity—i.e., one being positive, and the other being negative—to apply a discharge voltage to the igniter. Once appropriate operations have been completed, the igniter can then be manually removed from the housing, including via another engagement with the actuator (e.g., as described above) or by simply pulling the igniter out of engagement with the conductors.

In some embodiments, an actuator can be integrated with a housing, such as by being formed as a movable wall or other feature of a housing. In some embodiments, an actuator can be used to actively urge conductors within a housing into engagement with an inserted igniter or other conductive element. For example, an actuator can be used to actively urge conductors together (e.g., into contact with an igniter) rather than apart from each other.

FIGS. 1 through 8 illustrate aspects of an electrical connector 20 according to an embodiment of the invention. As shown in FIG. 1, the electrical connector 20 is attached to a jacketed cable 22 having two leads 24 and 26, which are configured to electrically couple to opposite poles of a power source (not shown). The power source can be, for instance, an ignition control unit for controlling the initiation of an exothermic reaction.

Figure 2:
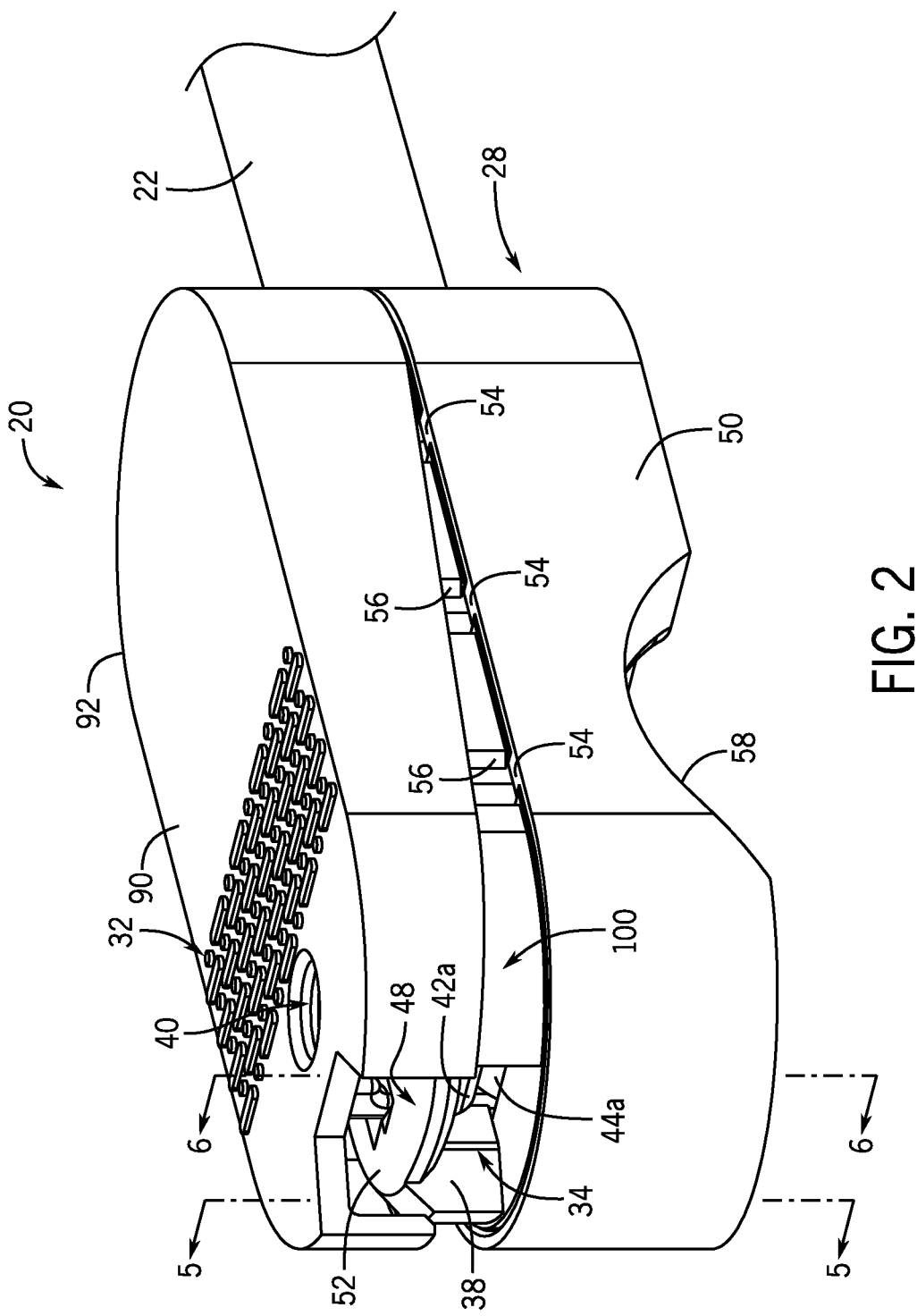
FIG. 2 is an isometric view of the electrical connector of FIG. 1.
Figure 3:
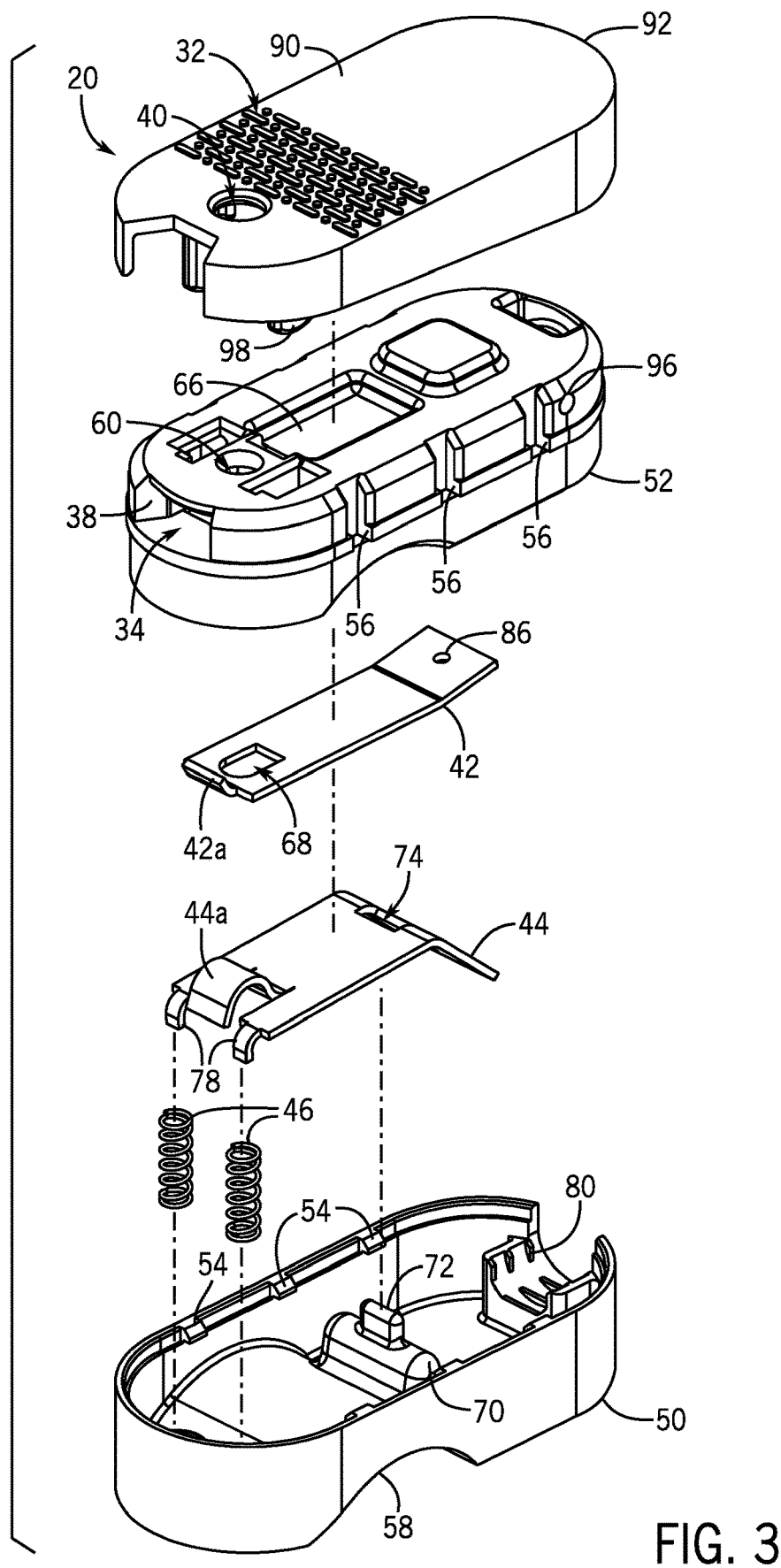
FIGS. 3 and 4 are isometric exploded views of the electrical connector of FIG. 1.
Figure 4:
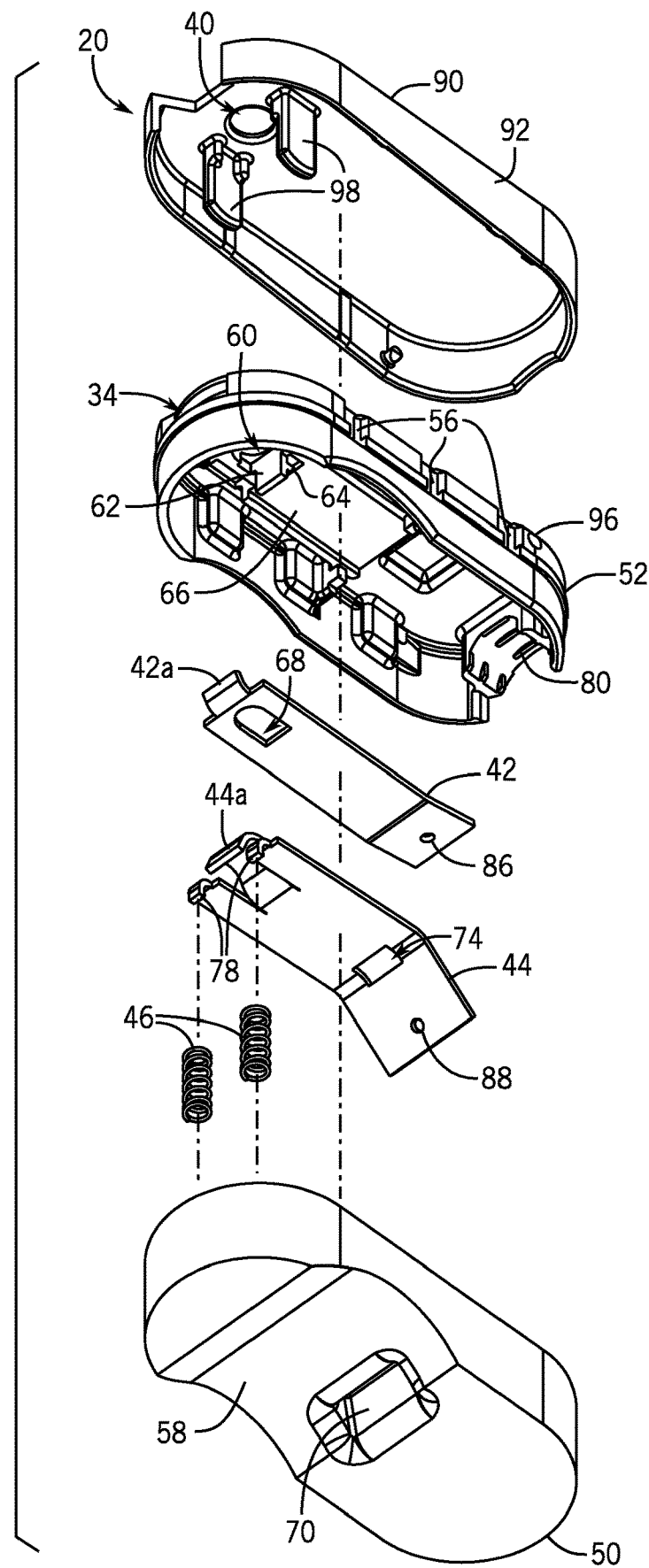

Referring in particular to FIGS. 2 through 4, the electrical connector 20 includes a housing 28 that defines an interior area 30. In the illustrated embodiment, external walls of the housing have a friction-grip pattern 32 for ease of handling and easy actuation (e.g., as discussed below), although other configurations are possible.

Figure 5:
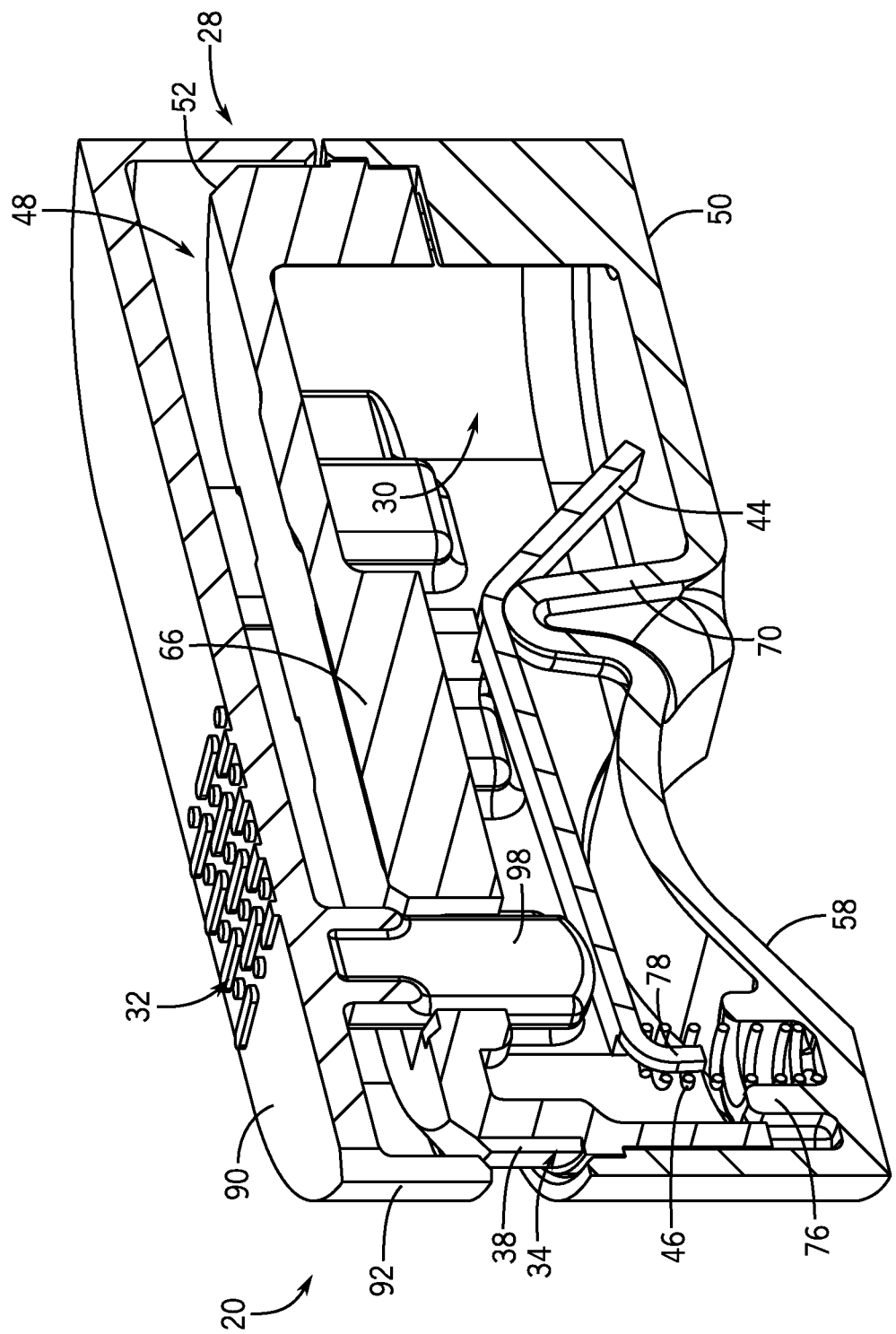
FIG. 5 is an isometric sectional view of the electrical connector of FIG. 1, taken along plane 5-5 of FIG. 2.

The housing 28 also has an opening 34 to receive an insertable conductor (not shown) into the interior area 30 (see, e.g., FIG. 5). For example, the opening 34 can be sized to receive an igniter strip or other igniter for an exothermic welding apparatus (e.g., igniter strip 36, shown in phantom in FIG. 6). In different embodiments, different types of openings can be provided. For example, the opening 34 is formed with a beveled exterior mouth 38 as may help to guide an insertable conductor into the housing 28. In other embodiments, however, other geometries are possible.

In some embodiments, additional openings can also be provided. For example, the housing 28 further include a viewing window 40 aligned to provide visual access to the interior area 30 of the housing. This may, for example, allow a user to visually inspect an insertable conductor within the housing or, in the absence of such an insertion, to visually inspect the space into which an insertable conductor may be extended. Accordingly, a user may be able to readily determine whether a particular igniter (or other conductor) has been appropriately inserted into the housing 28 (e.g., to engage electrodes therein, as further discussed below). Features such as the viewing window 40, beveled mouth 38 of the opening 34, and friction-grip pattern 32, for example, can all assist a user in one-handed insertion of the insertable conductor in some cases, including by allowing a user to move the electrical connector 20 in and out of electrical engagement with a particular igniter using a single hand to grip only the electrical connector 20 (e.g., as further discussed below).

As shown in FIGS. 3 through 7 in particular, the electrical connector 20 includes a first conductor 42 and a second conductor 44 within the housing 28. In the illustrated embodiment, the second conductor 44 is a movable conductor, the first conductor 42 is a fixed conductor, and the movable conductor 44 is biased by springs 46 toward the fixed conductor 42, although other configurations are possible. Further, in the illustrated embodiment, the springs 46 bias the second conductor 44 toward the first conductor 42 so that respective contact areas 42a, 44a of the conductors 42, 44 are in contact with each other when the movable conductor 44 is in a resting orientation (see, e.g., FIG. 6) and no insertable conductor is disposed therebetween. In other embodiments, however, other configurations are possible, including configurations in which each of at least two conductors is movable, configurations in which other types of springs or other biasing configurations are used (including self-biased conductors), and so on.

Generally, a housing of an electrical connector according to the invention can define an interior area that can enclose the relevant conductors, including a connection point between the conductors and an inserted igniter. For example, referring to FIGS. 3 and 4 in particular, the housing 28 provides a shell 48 around the conductors 42, 44, to generally insulate the conductors 42, 44 from the environment, via an exterior housing member 50 and an inner housing member 52. In the illustrated example, the shell 48 is formed as a pill-shaped shell that is substantially closed except for discrete, relatively small openings (e.g., the opening 34 and opening for visual inspection and for the cable 22), although other configurations are possible.

In some embodiments, multiple housing members to provide a housing shell can be manufactured so that they are easily secured together through a snap-fit (or other mechanical) connection, through the use of adhesive, or through another suitable process (e.g., ultrasonic welding). For example, to provide a snap-fit configuration, the housing member 50 includes prongs 54 that are configured to engage the shelved ends of slots 56 of the housing member 52 to secure the housing members 50, 52 together around the conductors 42, 44.

In some embodiments, a housing for an electrical connector can be manufactured from one or more non-conductive materials such as plastic (including phenolic plastic) and ceramics among others. Also, different housings or housing shells can be configured in a variety of shapes, including a pill shape as shown for the housing 28, a rectangular box shape (see, e.g., FIGS. 9-13), a circular box shape, any other appropriate polyhedron, and so on. To provide easy handling, the housing 28 is sized and shaped to fit between the thumb and index finger of a user, including with regard to a recess 58 on the outside of the outer housing member 50 that is configured to ergonomically receive a bent finger of a user while the user's thumb rests on an opposing side of the housing 28. In other embodiments, however, other sizes and external profiles are possible, including with regard to other hand-held configurations.

In different embodiments, housing portions can have various features to provide visual access to an interior area, to receive an insertable conductor into the housing, to secure one or more internal conductors, and so on. For example, the housing member 52 includes a viewing window 60 that is aligned with the exterior window 40 and also with a further window 68 in the first conductor 42. This arrangement can provide visual access into the interior area 30, such as may allow users to see into the housing 28 to verify whether a conductor has been received between the contact areas 42a, 44a of the conductors 42, 44.

In this regard, a protruding stop 62 that is aligned with the contact areas 42a, 44a to prevent over-insertion of a conductor (see, e.g., FIG. 6) is also aligned with the windows 40, 60, 68. Accordingly, as well as providing a stop feature to guide insertion of a conductor to an appropriate depth within the housing 28, the stop 62 can help to align an inserted conductor for inspection via the windows 40, 60, 68. Thus, for example, a conductor (e.g., the igniter strip 36) that has been inserted through the opening 34 until the conductor contacts the stop 62 can be seen from outside the housing 28 via the windows 40, 60, 68 (see, e.g., FIG. 6) and can thereby be visually verified as being appropriately inserted (e.g., as may indicate appropriate engagement of the inserted conductor by the contact areas 42a, 44a).

Although the illustrated configuration of the electrical connector 20 includes a succession of windows for visual inspection of an inserted (i.e., the windows 40, 60, 68), other configurations are possible. For example, some housings may include only a single window for visual inspection of an inserted conductor, only two windows, more than three windows, or a set of three windows arranged differently than the windows 40, 60, 68.

Figure 6:
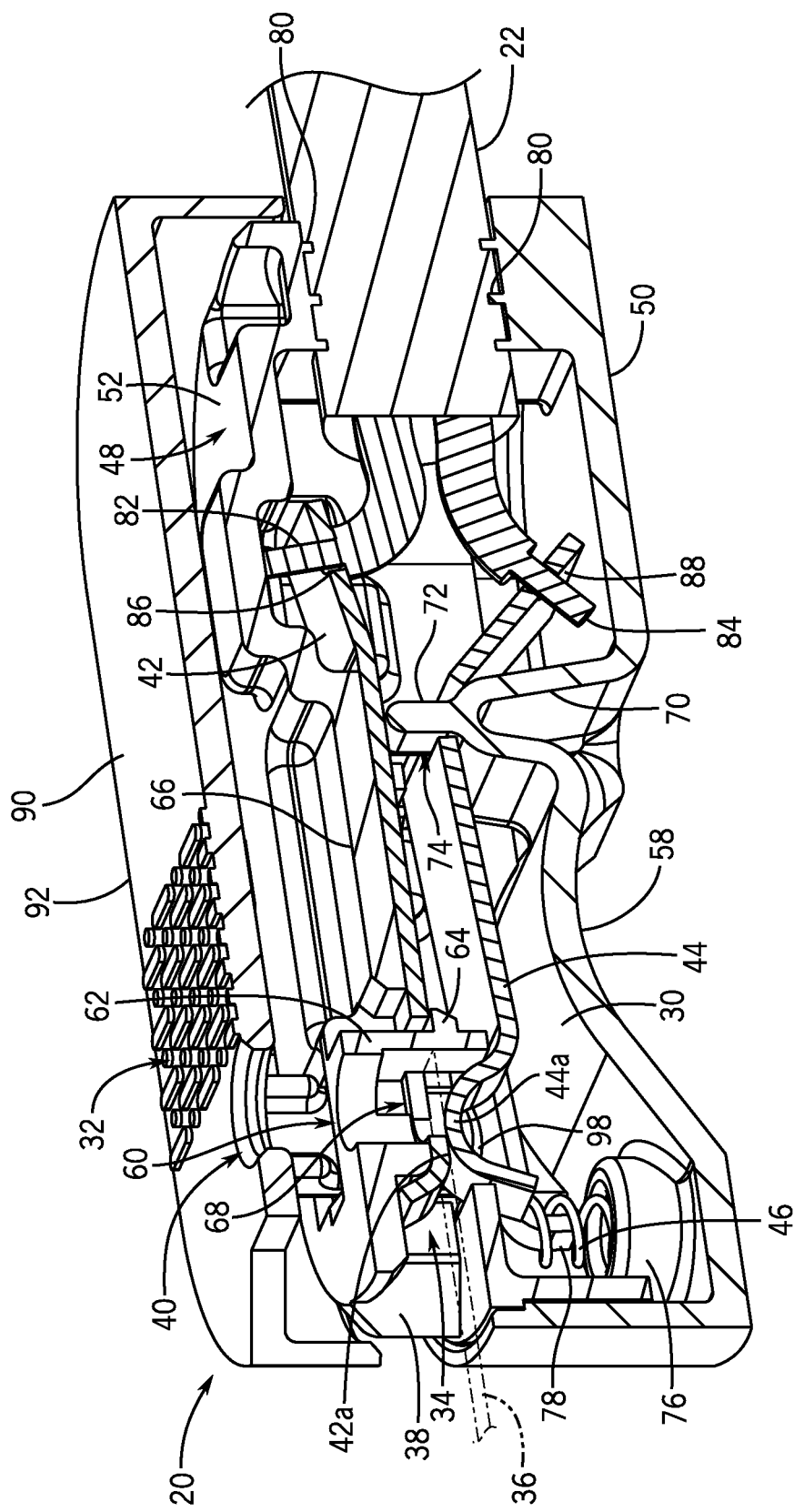
FIG. 6 is an isometric sectional view of the electrical connector of FIG. 1 in a resting orientation, taken along plane 6-6 of FIG. 2.

In some embodiments, a stop within a housing, or another similar feature, can also help to secure a conductor within an interior area of the housing. For example, as shown in FIG. 6 in particular, a ledge 64 on the stop 62 engages the first conductor 42, via extension of the protruding stop 62 through the window 68, to provide an anchor point for the first conductor 42 within the housing 28. The conductor 42 also sits flat against an interior side of an indented region 66, to be further held in place within the interior area 30, including as potentially secured in place on the indented region 66 using adhesives. Although inclusion of the ledge 64 on the stop 62 can provide efficiency in manufacturing and assembly, and can assist generally in ensuring appropriate alignment of components, some embodiments may include separate components to provide a stop and to secure a conductor, or may include only a stop or only a ledge (or other feature to secure a conductor). Similarly, although the indented configuration of the region 66 may allow for efficient manufacture of the inner housing member 52, other features can be provided to engage a conductor in other embodiments, including, as appropriate, other internal planar features against which the conductor can be seated.

In some embodiments, features on other portions of a housing can be used to secure a fixed (or other) conductor. For example, as also shown in FIG. 6, an internal protrusion is provided on the housing member 50, formed in the illustrated example as a stirrup 70 adjacent to the recess 58. The stirrup 70 extends through the interior area 30 toward the housing member 52 to contact the conductor 42, opposite the indented region 66, and thereby helps to further secure the conductor 42 within the interior area 30. Thus, for example, the fixed conductor 42 can be securely coupled to the housing member 52 of the housing 28, and within the interior area 30 generally, and can remain appropriately stationary when the housing 28 is actuated to move the conductor 44, as further discussed below.

Figure 7:
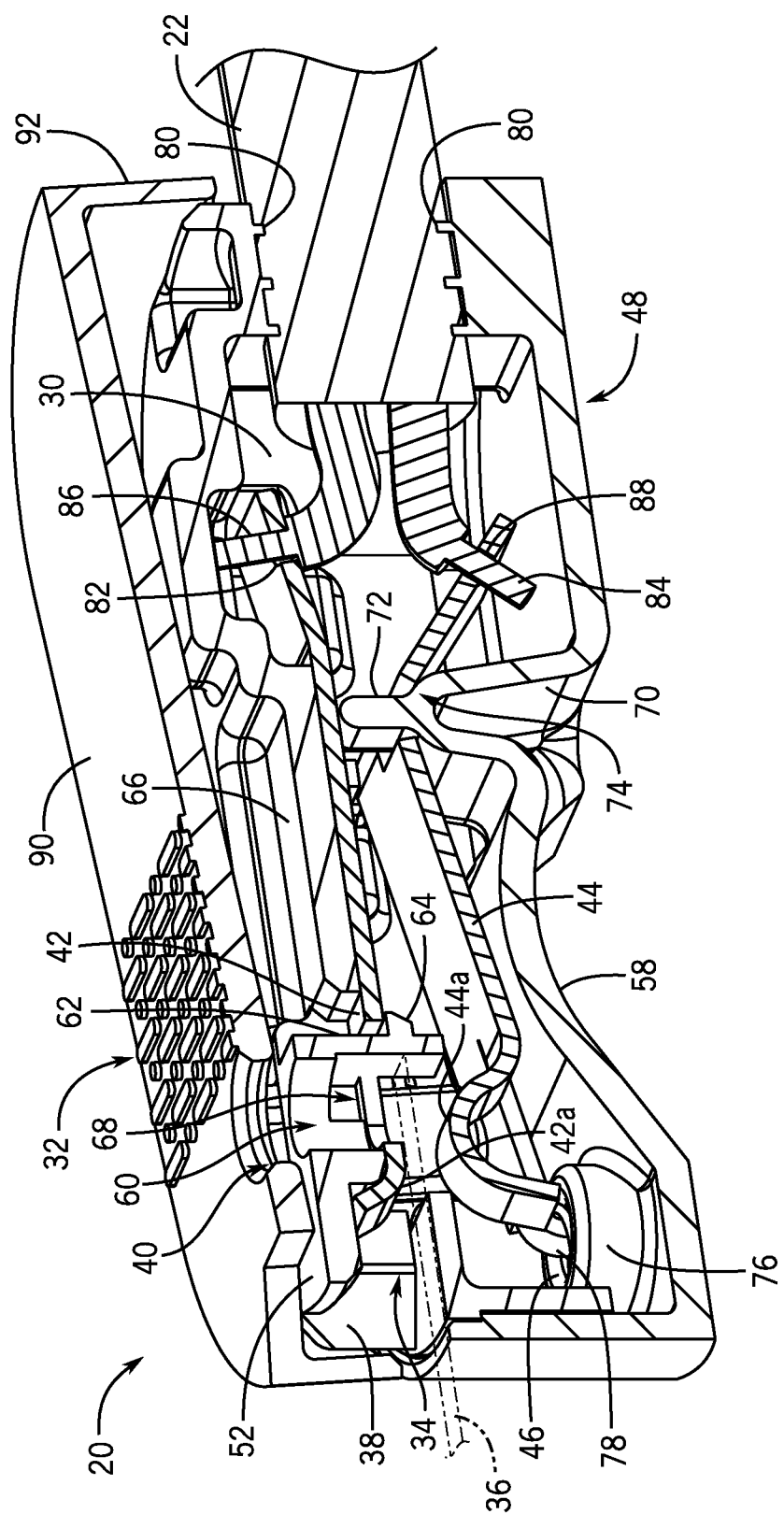
FIG. 7 is an isometric sectional view of the electrical connector of FIG. 1, similar to FIG. 6, but with the electrical connector in an actuated orientation.

In some embodiments, a feature to secure a fixed conductor can also be used to secure a movable conductor or to otherwise allow a movable conductor to move between resting and actuated orientations. As shown in FIGS. 6 and 7, for example, the stirrup 70 also provides a support and pivot point for the movable conductor 44. In particular, the stirrup 70 extends into the interior area 30 to pivotably support the conductor 44 near a mid-point of the housing 28. Further, an extension 72 of the stirrup 70 protrudes through an opening 74 in the conductor 44 to contact the conductor 42 and thereby help to secure the conductor 42 (as also discussed above). Thus, the base of the stirrup 70 can allow the conductor 44 to pivot within the housing 28, while the extension 72 can both prevent the movable conductor 44 from sliding forward or rearward within the housing 28 (i.e., to the right or left from the perspective of FIG. 7) and help to hold the fixed conductor 42 in place.

As noted above, in some embodiments, one or both conductors within a housing can be biased toward or away from each other. In particular, in the electrical connector 20, the springs 46 bias the movable conductor 44 toward the fixed conductor 42, although other configurations are possible, including configurations in which a different conductor is biased or either conductor is biased in a different direction. Correspondingly, the housing member 50 includes a set of internal tube-shaped bosses 76 (see FIG. 6, only one shown), each of which receives a respective end of one of the springs 46, opposite the conductor 44. Thus, the springs 46 can be secured against unwanted movement within the housing 28, while being held at a fixed location on the housing member 50 to provide appropriate biasing force to the conductor 44. In other embodiments, other structures (e.g., posts) can be used to secure springs or other biasing elements relative to a housing.

In the illustrated configuration, the biasing elements of the electrical connector 20 are formed as coil springs (i.e., the springs 46). However, other biasing elements can include leaf springs, wave springs, cantilever springs, blocks of resilient foam, rubber or other material, or various other components. Further in different embodiments, different connections between a movable conductor and a biasing element can be used. As illustrated in FIG. 3, for example, the movable conductor 44 includes two seating regions formed as curved prongs 78 on opposing sides of the contact area 44a, which can receive respective ends of the springs 46 opposite the bosses 76. In other embodiments, however, other configurations are possible. In some embodiments, the natural resiliency of a movable conductor may itself provide appropriate biasing force, including in opposition to force applied by an actuator to move the conductor between resting and actuated orientations.

In different embodiments, different interfaces for conductive connections between conductors within a housing can be provided. For example, to help ensure appropriate contact between the conductors 42, 44 and an insertable conductor received therebetween (see, e.g., FIG. 6), each of the contact areas 42a, 44a includes a protruding curve, which are arranged convexly relative to each other. This arrangement can provide a relatively small contact area for an insertable conductor, such as may help to securely hold the insertable conductor in place and to ensure appropriate electrical connection between the insertable conductor and the conductors 42, 44. Further, the curved (and concave) arrangement of the contact areas 42a, 44a can also facilitate easier insertion of an insertable conductor therebetween, including by passively guiding the insertable conductor into an appropriate insertion orientation. The curved configuration of the contact areas 42a, 44a can also help to ensure that the conductors 42, 44 do not inadvertently contact each other, or an inserted conductor, at locations other than the contact areas 42a, 44a.

In the illustrated example, the contact areas 42a, 44a are configured to be in contact with each other when in a resting orientation (i.e., to be spaced apart from each other by a distance of zero), in part due to the biasing force provided by the springs 46. Thus, for example, when the contact areas 42a, 44a are spaced apart from each other by an intervening insertable conductor (e.g., the igniter strip 36 in FIG. 6), the biasing force from the springs 46 may tend to urge the contact areas 42a, 44a toward each other and thereby help to secure the insertable conductor in place.

In other embodiments, however, other configurations are possible, including configurations in which contact areas of opposing conductors exhibit different geometries or are not in contact when in a resting orientation. For example, in some configurations, contact areas may be configured to be spaced apart from each other, when in the rest orientation, by a distance that is greater than zero but smaller than the expected thickness of an insertable electrical conductor that is configured to be held therebetween. Further, in some embodiments, contact areas can be formed with other geometries.

Figure 8:
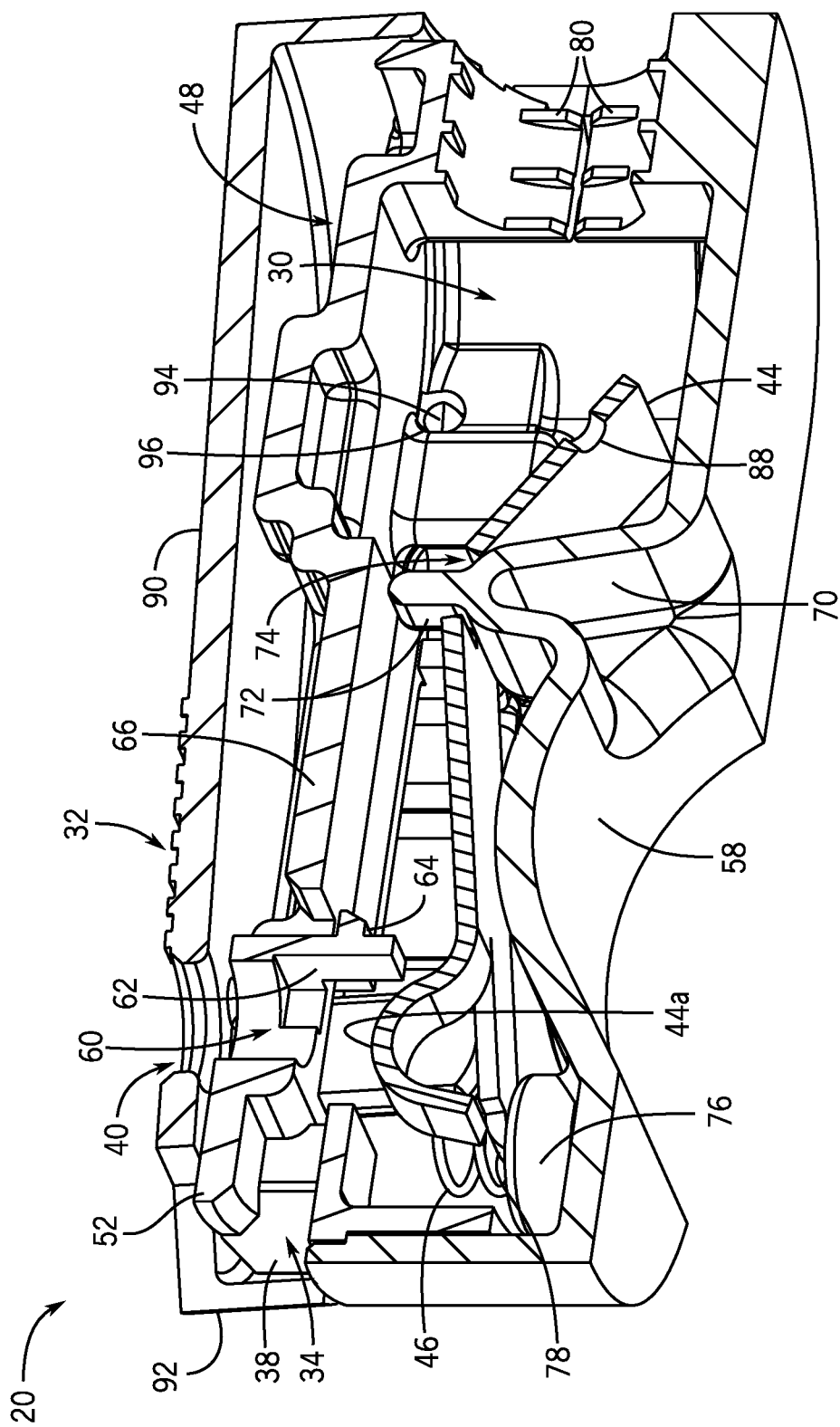
FIG. 8 is an isometric cross-sectional view of the electrical connector of FIG. 1, similar to FIG. 7, but with some components removed to show certain housing structures.
Figure 9:
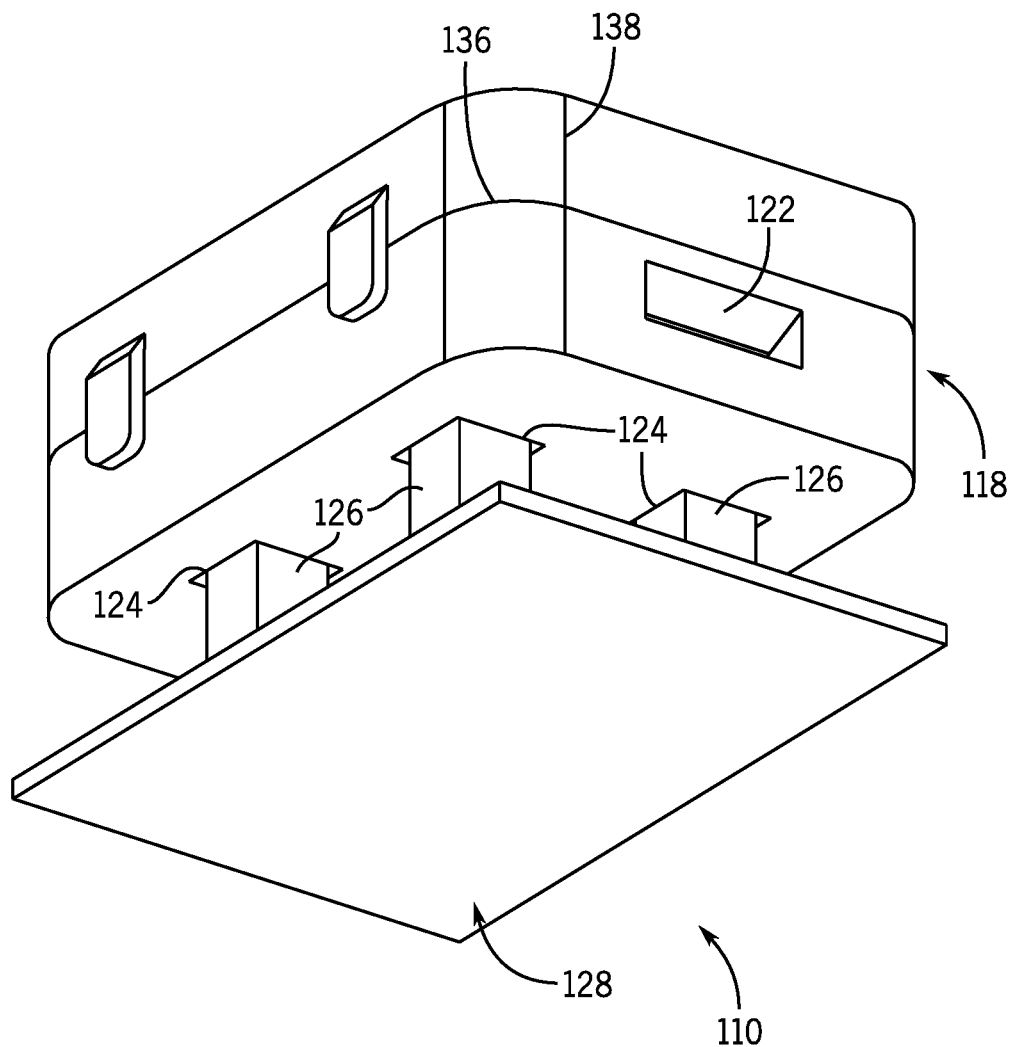
FIG. 9 is an isometric view of an electrical connector according to another embodiment of the invention.

As illustrated in FIGS. 6 through 8, in particular, the housing 28 includes ribbing 80 near one end of the electrical connector 20, which is configured to grip the insulation of the jacketed cable 12 to secure the cable 12 to the electrical connector 20. Thus, leads 82, 84 of the cable 22 can be appropriately located to be engaged with the conductors 42, 44, respectively, within the interior area 30 of the housing 28. In the illustrated example, each of the conductors 42, 44 includes an attachment point formed as an opening 86, 88, respectively, to receive the leads 82, 84, although other configurations are possible. For example, in some embodiments, conductors within a housing can be connected to relevant leads in other ways, including through soldering, crimping, or other known approaches.

As also noted above, some embodiments can include a housing with a movable wall or another actuator that can be manually moved from outside of the housing in order to move one or more conductors within the housing between different orientations. In this regard, in the illustrated example, the housing 28 further includes an actuator formed as an exterior wall 90 of the housing 28, opposite the housing member 52 from the housing member 50 and generally outside of the shell 48. Thus, the wall 90 generally forms a button that extends the length of the housing 28 and can be actuated from outside of the housing 28 (e.g., manually) in order to move the conductor 44 away from the conductor 42 (e.g., from the resting orientation of FIG. 6 to the actuated orientation of FIG. 7).

Thus, for example, by pressing on the exterior wall 90, a user can move the conductor 44 to be spaced farther from the conductor 42 in order to receive or release a conductor (e.g., the igniter strip 36) that is inserted through the opening 34 between the contact areas 42a, 44a. And, by releasing the exterior wall 90, a user can then allow the conductor 44 to move back toward the conductor 42, such as to secure the inserted conductor between the conductors 42, 44 with the inserted conductor in electrical communication with the conductors 42, 44, via contact with the contact areas 42a, 44a on opposing sides of the inserted conductor.

In different embodiments, an actuator can move an interior conductor in different ways. For example, the exterior wall 90 is formed as part of an outer housing member 92 that partially surrounds the inner housing member 52 and the shell 48 generally, but is internally spaced apart from the housing member 52, opposite the conductors 42, 44 and the housing member 50, when in a rest orientation (see FIG. 6). Further, the exterior wall 90 is pivotably secured to the housing member 52 via a pin 94 at an opening 96 (see FIG. 8). Accordingly, as a user presses on exterior wall 90, the housing member 92 can pivot about the pin 94, with a forward end of the exterior wall 90 (i.e., to the left in FIGS. 6-8) thereby moving closer to the shell 48 and, generally, toward the interior area 30. Due to this movement, a protrusion from the housing member 92 that extends into the interior area 30 can then bear on the conductor 44, in order to move the conductor 44 in a similar direction (e.g., away from the conductor 42, in the configuration shown), away from a resting orientation.

In different embodiments, differently configured protrusions can be provided to move a conductor within a housing. For example, as shown in FIGS. 4 and 5 in particular, the housing member 92 includes a set of two posts 98 that extend symmetrically from the exterior wall 90 through respective openings in the housing member 52 (and the shell 48 generally), and past the conductor 42, to contact planar portions of the prongs 78 of the conductor 44. Accordingly, as the exterior wall 90 pivots toward the shell 48, the posts 98 can cause the conductor 44 to pivot about the stirrup 70, away from the conductor 42, without any relative movement of the conductor 42 or the housing members 50, 52. As well as providing generally good stability and responsiveness, the use of two posts 98 corresponding to and generally aligned with the springs 46 can also provide for durable and easy operation of the electrical connector 20 over a substantial number of actuation cycles.

In some embodiments, other features can be provided. For example, as shown in FIG. 2, an angled gap 100 is formed between an inner edge of the housing member 92 and an inner edge of the housing member 50 when the exterior wall 90 (and the electrical connector 20 generally) is in the rest orientation. In some configurations, as the housing member 92 is pivoted to move the conductor 44 toward the actuated orientation (see, e.g., FIG. 7), a closing of the gap 100 can provide a tactile stop to prevent excessive rotation of the housing member 92, such as might result in damage to internal components of the electrical connector 20.

To facilitate ergonomic handling of the electrical connector 20, as also noted above, the housing member 50 also includes the recess 58, formed as a rounded indent that is formed to fit comfortably around the finger of a user. Thus, a user can use a single hand to comfortably grip the housing 28 and still obtain sufficient leverage to actuate the exterior wall 90. In other embodiments, other geometries can provide similar benefits. Further, as also noted above, an actuator can be secured, shaped, or operated differently than the exterior wall 90. For example, some actuators may be formed as part of an interior shell of a housing rather than as a separate housing member outside of a shell (e.g., as with the housing member 92 and the shell 48).

Thus, through implementation of one or more of the concepts discussed above, an insertable conductor can be readily and predictably inserted and retained within the electrical connector 20 for operational use. For example, as also discussed generally above, once the exterior wall 90 is actuated to move and retain the conductor 44 in the actuated orientation (see, e.g., FIG. 7), an insertable conductor (e.g., the igniter strip 36) can then be guided into the electrical connector 20 through opening 34 and received between the fixed conductor 42 and the movable conductor 44. In some implementations, including where the insertable conductor is already secured to a relatively fixed welding apparatus, the electrical connector 20 can be moved to receive and engage the insertable conductor with a single hand, without necessarily requiring a user to also hold onto the insertable conductor.

Once a conductor has been inserted into the housing 28, a user can then visually inspect the conductor, through the windows 40, 60, 68, to determine whether the insertable conductor has been received correctly between the movable conductor 44 and the fixed conductor 42. Further in this regard, as also noted above, the stop 62, extending into alignment with the contact areas 42a, 44a, can provide a contact area for the insertion end of the insertable conductor. For the illustrate arrangement, this can help to prevent over-insertion of the insertable conductor, allowing the insertable conductor to be repeatably and easily inserted to a uniform depth, and also align the insertable conductor for easy visual inspection via the windows 40, 60, 68. Such repeatable and appropriate alignment and depth of placement for the conductor, for example, can help to ensure that current can successfully be conducted to the insertable conductor via the conductors 42, 44.

Once the insertable conductor has been correctly inserted into the electrical connector 20 (e.g., as verified by visual inspection), the user can release pressure from the exterior wall 90, so that the springs 46 can return the movable conductor 44 toward the fixed conductor 42 and thereby return the conductor 44 and the exterior wall 90 toward the rest orientation. As a result, as illustrated in FIG. 6, the movable conductor 44 can then press the insertable conductor against the fixed conductor 42 to securely and electrically couple the movable conductor 44, the insertable conductor, and the fixed conductor 42, with the contact areas 42a, 44a of the conductors 42, 44 engaging opposing sides of the insertable conductor. Current can then be delivered from a power source (not shown) through the wires of jacketed cable 22 to the movable and fixed conductors 42, 44 and to the insertable conductor. As appropriate, after completion of the desired operations with the insertable conductor, the insertable conductor can then be removed by again pressing the exterior wall 90 to move the movable conductor 44 away from the rest orientation and thereby release the insertable conductor from between the conductors 42, 44.

FIGS. 9 through 12 illustrate an electrical connector 110 according to another embodiment of the invention. The electrical connector 110 includes a housing 118 with a lower portion 136, an upper portion 138, and a beveled opening 122. The lower portion 136 has four snap protrusions 140 configured to mate with four snap prongs 142 of the upper portion 138. A fixed electrode 134 and a movable electrode 132 are seated within housing 118, and can be attached to opposite poles of a power source (not shown). The fixed electrode 134 is attached to the lower portion 136 of the housing 118, which also includes four through-holes 124 spaced apart to receive four legs 126 of an actuator 128.

Figure 10:
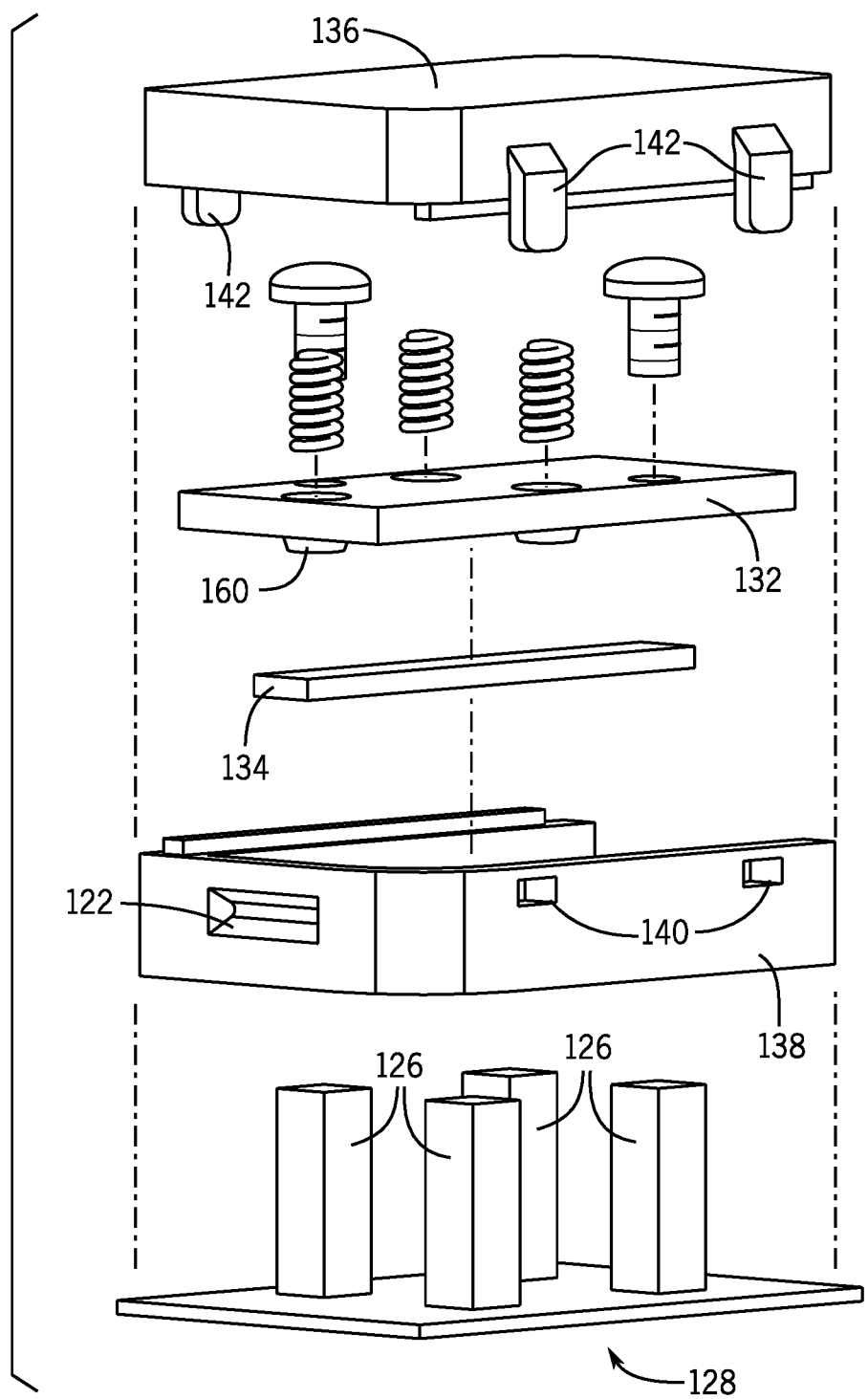
FIG. 10 is an isometric exploded view of the electrical connector of FIG. 9.
Figure 11:
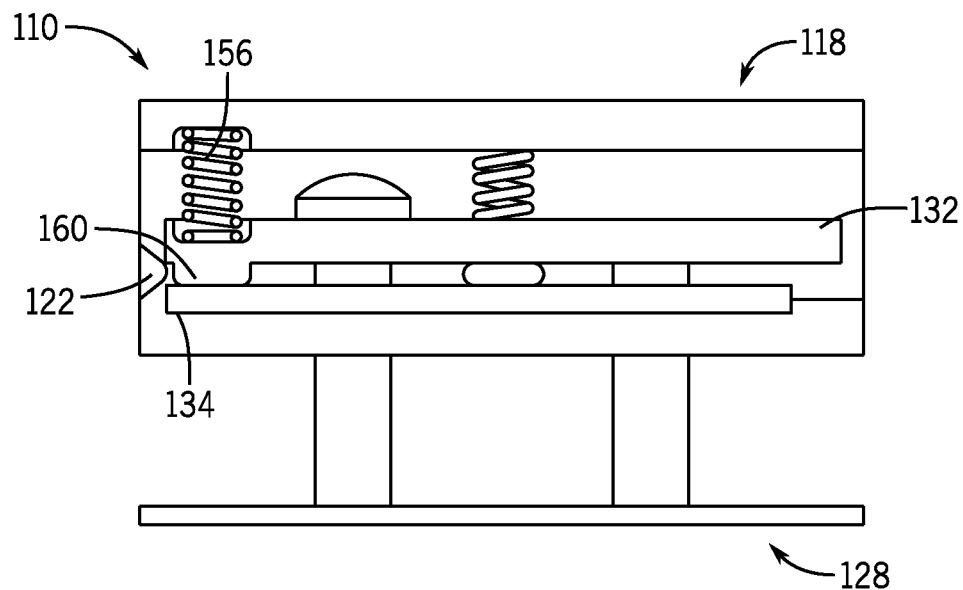
FIG. 11 is a cross-sectional view of the electrical connector of FIG. 9 in a resting orientation.
Figure 12:
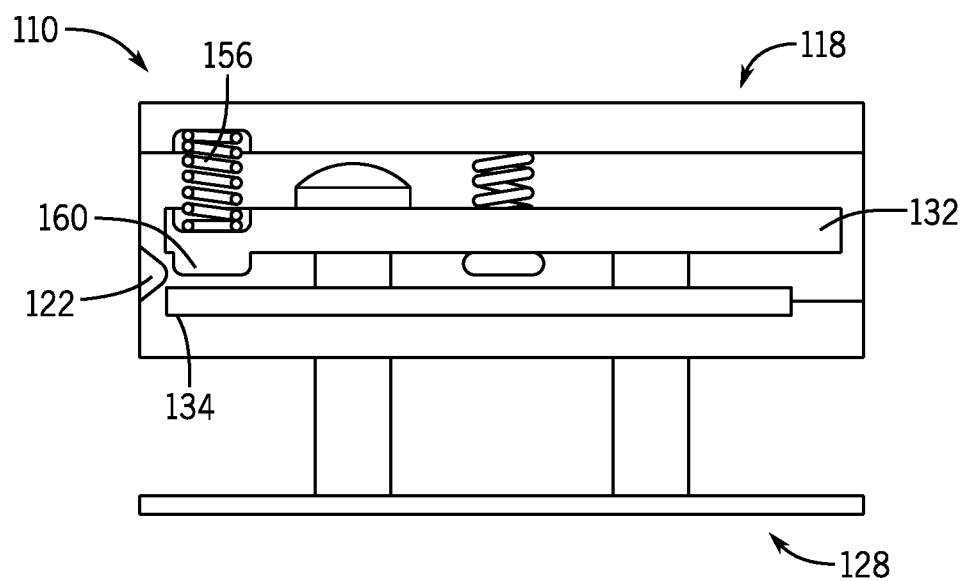
FIG. 12 is a cross-sectional view of the electrical connector of FIG. 9 in an actuated orientation.

The actuator 128 is mechanically coupled to the movable electrode 132, which is biased against the fixed electrode 134 via a biasing element 156 such as a coil spring. The movable electrode 132 includes a protruding boss 160 that protrudes from the movable electrode 132 toward the fixed electrode 134 and provides the contact surface between the movable electrode 132 and the fixed electrode 134. As shown in FIG. 10, when the electrical connector is at rest, the movable electrode 132 is biased against the fixed electrode 134 within the housing 118, although other configurations are possible. In this regard, for example, FIG. 12 illustrates the actuator 128 being pressed upwardly (or the housing 218 being pressed downwardly) to translate the movable electrode 132 linearly away from the fixed electrode 134 and against the biasing element 156.

The electrical connector 110 illustrated in FIGS. 8 through 18 can be used by pressing (or otherwise engaging) the actuator 128 to translate the movable electrode 132 linearly away from the fixed electrode 134, inserting an insertable conductor (not shown) into the beveled opening 122, and releasing the actuator 128 so that the biasing element 156 presses the boss 160 of the moveable electrode 132 to hold the insertable conductor between the moveable electrode 132 and the fixed electrode 134. When the movable electrode 132, the insertable conductor, and the fixed electrode 134 are electrically coupled, current can be delivered to the insertable conductor. The insertable conductor can then be released by again pressing the actuator 128 and removing the insertable conductor.

Figure 13:
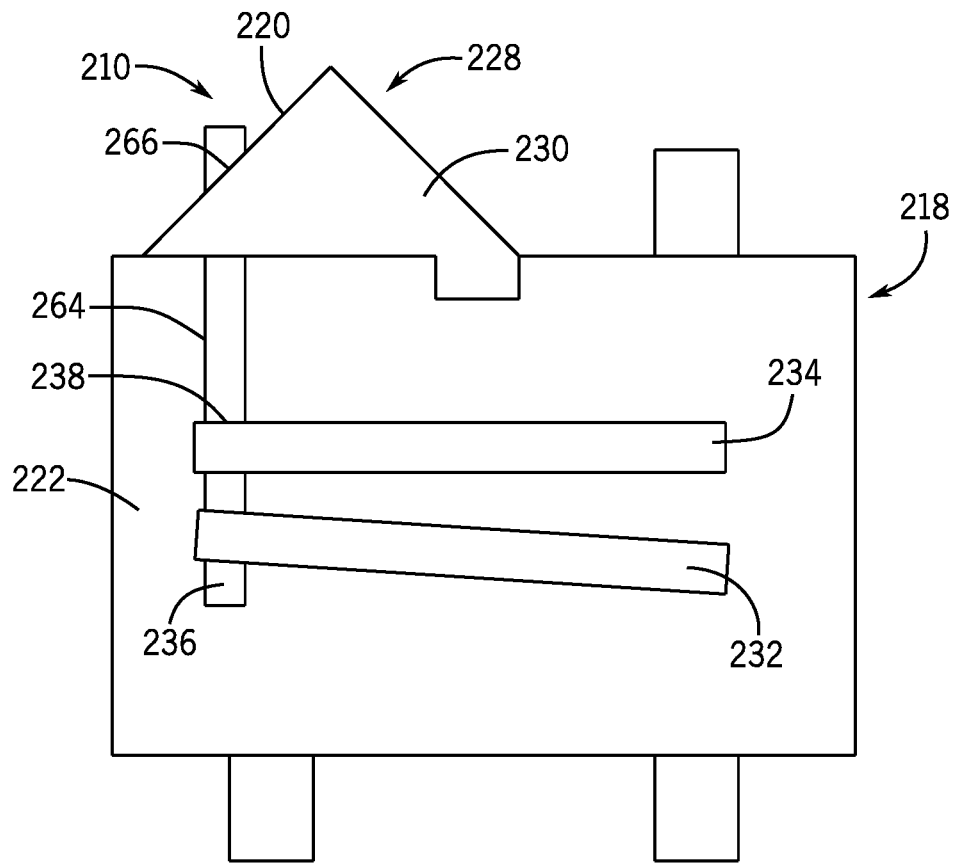
FIG. 13 is a cross-sectional view of an electrical connector according to yet another embodiment of the invention.
Figure 14:
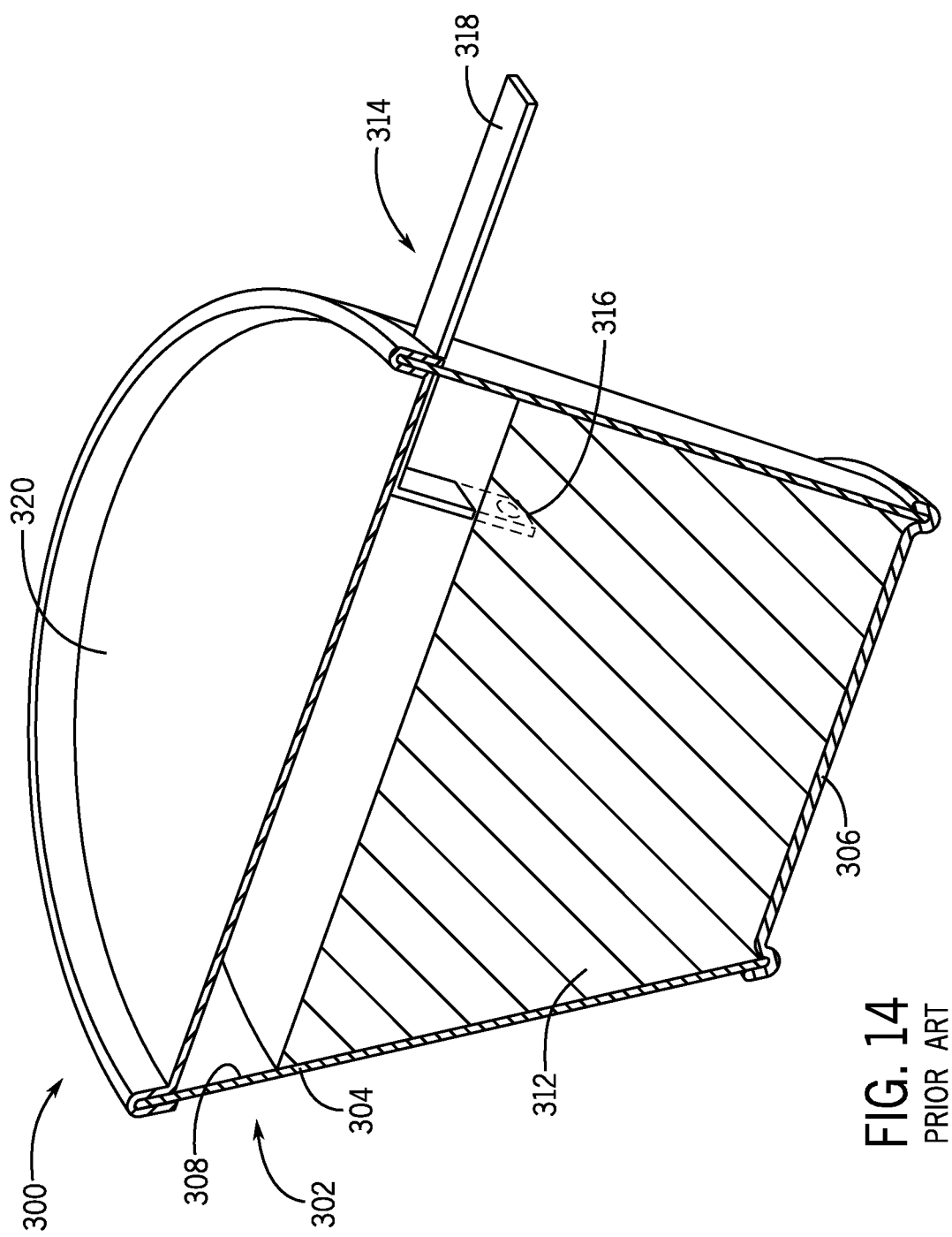
FIG. 14 is a cross-sectional isometric view of an example container for weld material, including an igniter strip, for use with embodiments of the invention.

FIG. 13 illustrates an electrical connector 210 according to still another embodiment of the invention. The electrical connector includes a housing 218, an actuator 228, an opening 342, a lower electrode 232 and an upper electrode 234. The electrodes 232, 234 can be electrically coupled to a power source (not shown). The actuator 228 includes a slidable button 230 and a movable shaft 264. The movable shaft 264 has an opening 266 through which a face 220 of the button 230 can be moved. The movable shaft 264 also includes an opening 236 for the electrode 232 and a bypass 238 (e.g., an open- or closed-sided slot) for the electrode 234. The opening 266 or the face 220 (or both) are angled so that when the button 230 is translated linearly toward the movable shaft 264, engagement between the face 220 and the opening 266 moves the movable shaft 264 (i.e., upward in the illustrated orientation). Correspondingly, engagement of the movable shaft 264 with the lower electrode 232 at the opening 236 can cause the lower electrode 232 to be moved toward the upper electrode 234. In this way, for example, an insertable conductor (not shown) can be inserted into the opening 342, and when the button 230 is moved forward, the lower electrode 232 can be moved (e.g., pivoted) to press the insertable conductor against the upper electrode 234. When the lower electrode 232, upper electrode 234, and the insertable conductor are all in contact with one another, current can then be delivered from the power source to the insertable conductor.

Other configurations of an electrical connector are contemplated. For example, an actuator can be formed as a cam or a lever to press two conductors within the electrical connector housing together around an insertable conductor in a similar manner as described above. In some embodiments, a cam and a lever can act on one or more conductors within a housing. In some embodiments, an actuator can be configured to translate linearly, rotate, or twist. In some embodiments, aspects of certain embodiments expressly described above can be interchanged or combined with aspects of other embodiments. For example, actuators as illustrated for any one of the connectors 20, 110, or 210 can be used with components illustrated as included with any of the other connectors 20, 110, or 210.

In different implementations, different embodiments of the invention can be used with a variety of different containers or other configurations of weld material. For example, FIG. 13 illustrates a prior art sealed crucible assembly 300 containing weld material 312. The crucible assembly 300 includes a container 302 having sidewalls 304 and a fusible bottom 306. A refractory material 308 lines the sidewalls 304 of the container 302, which contain a pre-measured amount of the weld material 312. An igniter 314 has a first end 316 situated above or partially within the weld material 312, and a second end 318 protruding from the container 302. The second end 318 may be coupled to a voltage supply, such as by the electrical connectors 20, 110, 210 (or others), to produce a voltage sufficient to cause a plasma or spark at the first end 316. The plasma or spark from the igniter 314 can ignite the weld material 312, thereby causing an exothermic chemical reaction within the container 302. A cover 320 may be placed over the top of the container 302, to maintain weld material 312 within the container 302, or to prevent ingress of dirt, moisture, or other undesirable substances. In other implementations, other configurations of weld material and igniters can be otherwise used with embodiments of the invention.

Thus, embodiments of the invention can provide an improved electrical connector relative to conventional designs, including for electrical connections to ignite exothermic welding. For example, in some embodiments, electrical connectors can be configured to provide easily attainable and verifiable, while also highly secure, connections between electrodes and insertable conductors, including through operations that can be performed with a single hand.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. An electrical connector for an igniter for exothermic welding, the electrical connector comprising:
    a housing;
    a first conductor enclosed by the housing; and
    a second conductor enclosed by and movable within the housing;
    the housing providing:
        a first opening to receive the igniter for engagement with the first and second conductor;
        a housing wall that is movable, via manual contact from outside of the housing, to move the second conductor within the housing between a resting orientation and an actuated orientation; and
        a first window that provides visual access to an interior area of the housing to verify engagement of the igniter with the first and second conductors;
    a contact area of the second conductor being spaced farther from the first conductor when the second conductor is in the actuated orientation than when the second conductor is in the resting orientation; and
    the contact area being disposed, when the second conductor is in the resting orientation, to contact a first side of the igniter, with a second side of the igniter in contact with the first conductor.

2. The electrical connector of claim 1, wherein the housing wall is configured to pivot on the housing to move the second conductor.

3. The electrical connector of claim 1, wherein the first window extends through the housing wall and is aligned with a second window through one of the first or second conductors.

4. The electrical connector of claim 1, wherein the housing wall includes a first post that protrudes into an interior area of the housing to contact the second conductor and thereby move the second conductor when the housing wall is moved.

5. The electrical connector of claim 4, wherein the first post extends from the housing wall past the first conductor to contact the second conductor.

6. The electrical connector of claim 4, wherein the housing wall further includes a second post that protrudes into the interior area of the housing to contact the second conductor and thereby move the second conductor when the housing wall is moved, the second post being opposite the contact area of the second conductor from the first post.

7. The electrical connector of claim 4, wherein the housing includes an inner housing member disposed between the housing wall and the first and second conductors;
    wherein the inner housing member at least partly defines a housing shell that encloses the first and second conductors separately from the housing wall; and
    wherein the first post extends through the inner housing member to contact the second conductor.

8. The electrical connector of claim 7, wherein the housing wall is configured to pivot on the inner housing member to move the second conductor.

9. The electrical connector of claim 1, wherein the second conductor is biased toward the first conductor.

10. The electrical connector of claim 9, wherein the first conductor is fixed within the housing.

11. The electrical connector of claim 10, wherein the first conductor is disposed between the housing wall and the second conductor.

12. The electrical connector of claim 10, wherein the second conductor pivots on an internal protrusion of the housing to move between the resting and actuated orientations.

13. The electrical connector of claim 12, wherein the internal protrusion extends past the second conductor toward the first conductor.

14. An electrical connector for an igniter for exothermic welding, the electrical connector comprising:
    a first conductor;
    a second conductor;
    a housing shell that encloses the first and second conductors within an interior area, with an opening into the interior area to receive the igniter for conductive engagement with the first and second conductors; and
    a housing wall that is movably secured to and at least partly outside of the housing shell, the housing wall being configured to be moved from outside of the housing shell to move the second conductor between a resting orientation and an actuated orientation;
    wherein the housing wall includes a first post that protrudes into the interior area of the housing shell to contact the second conductor and thereby move the second conductor when the housing wall is moved;
    with the second conductor in the resting orientation, the first and second conductor engaging both sides of the igniter to secure the igniter within the interior area and provide an electrical path from the first conductor to the second conductor via the igniter; and with the second conductor in the actuated orientation, the first and second conductor releasing the igniter to be removed from the interior area via the opening.

15. The electrical connector of claim 14, wherein the first post extends past the first conductor to actuate the second conductor.

16. The electrical connector of claim 14, further comprising:
a first window that provides visual access to the interior area to verify engagement of the igniter with the first and second conductors; and
an internal stop that is disposed to stop insertion of the igniter into the housing shell, via the opening, with the igniter in visual alignment with the first window.

17. The electrical connector of claim 14, further comprising:
a spring within the housing shell to bias the second conductor toward the first conductor and oppose movement of the second conductor by the housing wall.

18. An electrical connector for an igniter strip for exothermic welding, the electrical connector comprising:
a first conductor with a first contact area;
a second conductor with a second contact area; and
a housing that includes:
an actuator configured as a housing wall that is manually movable via engagement from outside of the housing to move the second conductor between a resting orientation and an actuated orientation;
an interior area that encloses the first and second conductors, the first conductor being disposed between the housing wall and the second conductor and fixed within the housing, and the second conductor being biased toward the first conductor; and
an opening to receive the igniter strip into the interior area;
the second contact area, with the second conductor in one of the resting or actuated orientations, being spaced a first distance from the first contact area to hold the igniter strip between the first and second contact areas; and
the second contact area, with the second conductor in the other of the resting or actuated orientations, being spaced a second distance from the first contact area that is larger than the first distance.

19. The electrical connector of claim 18, wherein the actuator is configured to pivot toward the interior area to pivot the second conductor away from the first conductor within the interior area.

20. The electrical connector of claim 18, wherein the actuator includes a first window to provide visual access to an interior area of the housing to verify engagement of the igniter strip with the first and second conductors.

* * * * *